United States Patent [19]
Weh et al.

[11] Patent Number: 5,095,947
[45] Date of Patent: Mar. 17, 1992

[54] PRESSURE-SEALED PLUG COUPLING

[76] Inventors: Erwin Weh; Wolfgang Weh, both of Siemensstr. 5, Illertissen, Fed. Rep. of Germany, D-7918

[21] Appl. No.: 457,811
[22] PCT Filed: May 3, 1989
[86] PCT No.: PCT/EP89/00491
§ 371 Date: Jan. 2, 1990
§ 102(e) Date: Jan. 2, 1990
[87] PCT Pub. No.: WO89/11059
PCT Pub. Date: Nov. 16, 1989

[30] Foreign Application Priority Data

May 5, 1988 [DE] Fed. Rep. of Germany ....... 3815350
Jun. 24, 1988 [DE] Fed. Rep. of Germany ... 8808148[U]

[51] Int. Cl.⁵ .............................................. F16L 37/28
[52] U.S. Cl. ................................ 137/614.06; 285/321
[58] Field of Search ................ 137/614.06; 251/149.9, 251/149.6; 285/316, 321

[56] References Cited

U.S. PATENT DOCUMENTS

| | | | |
|---|---|---|---|
| 2,675,829 | 4/1954 | Livers | 137/614.06 |
| 3,234,965 | 2/1966 | Anderson | 137/614.04 |
| 3,680,591 | 8/1972 | Vik | 137/614.06 |
| 4,249,572 | 2/1981 | Shinelelar et al. | 251/149.6 |
| 4,376,525 | 3/1983 | Frëmy | 285/321 |
| 4,549,577 | 10/1985 | Kugler | 137/614.06 |
| 4,613,112 | 9/1986 | Philpot et al. | 251/149.6 |
| 4,681,350 | 7/1987 | Gaita | 285/316 |

FOREIGN PATENT DOCUMENTS

552435 4/1943 United Kingdom ........... 137/614.04

Primary Examiner—A. Michael Chambers
Attorney, Agent, or Firm—Spensley Horn Jubas & Lubitz

[57] ABSTRACT

For a simple operation and high safety in a coupling for fluids under pressure, an arrangement of an inlet valve, a ventilation valve and an outlet valve in the coupling housing is proposed, the inlet valve, and ventilation valve being brought alternately into the open position by an operating device, e.g., an eccentric shaft. Due to this alternate blocking of the valves, at least one valve is always closed even on faulty handling, so that fluid under pressure cannot escape. This coupling is thus suitable especially for high pressure filling at filling stations, since high safety and simple operation are achieved. A simplified coupling is described, which can be operated by hand, enabling fast coupling and disconnection, so that fluid cannot flow out.

15 Claims, 10 Drawing Sheets

PRESSURE-SEALED PLUG COUPLING

FIELD OF THE INVENTION

The invention relates to a pressure-sealed plug coupling for providing a pressure-sealed connection to a counter-connecting member. Such plug couplings are used for detachably connecting fluid lines together or to counter-connecting elements, such as tanks or conduits.

BACKGROUND OF THE ART

Such a coupling is known from EP-A-0202592, a piston in a cylindrical housing being shiftable, and moving at its front end clamping jaws radially adjustable by axial displacement via a ramp arrangement. The induced axial reciprocating movement of the piston is effected by a hand lever.

This known plug coupling is, however, only suitable for coupling fluid lines such as filling hoses for tanks under relatively low pressure since, on disconnection, the filling lines remain under pressure, the roll of the clamping jaws being under considerable pressure due to axial pressure application. Disconnection by radially pushing the clamping jaws apart is thus only possible by considerable power application even with corresponding power step-up of the hand lever. Thus, ventilation valves are known at filling tanks or pumps; said valves can, however, be operated in a separate stage after operation of a further shut-off valve and before release of the coupling. This can, however, lead to high safety risk especially due to leakage of inflammable of explosive fluids if operation is incorrect, e.g., if individual valves are operated in the wrong order. This is true of filling stations where vehicles are tanked up with gaseous fuel.

German Disclosure Publication 28 23 886 (corresponding to U.S. application Ser. No. 801,719) shows a similar coupling device with a shiftable piston actuated by eccentric handle and with a clamping jaw actuated by a second handle. As two handles have to be actuated by the operator the handling of the coupling device is rather complicated and may cause danger, if the two handles are changed by mistake.

U.S. Pat. No. 3,474,827 has a coupling device having a flow passage through it; a valve member at one end of the passage can be moved to open or close the coupling device by an operating lever. Connection of the coupling device to an adapter is made by rotating the coupling device relative to the adapter and causing an engagement of notches within recesses. However, rotating the coupling device is complicated and uncomfortable to use. The same is true with respect to further French Patent 12 35 444, as two levers have to be actuated to connect or disconnect the coupling device.

SUMMARY OF THE INVENTION is the main object of the invention to provide a plug coupling which allows a fast and safe connection or disconnection. These and other objects of the invention are accomplished by a coupling for fluid lines for pressure-sealed connection to a counter-connection, especially on a tank, with an axially displaceable piston in the coupling housing and an operating device for displacing the piston as well as at least one clamping element for connection to the counter-connection, wherein in the housing an inlet valve (A), a ventilation valve (B) and an outlet valve (C) are arranged; the inlet valve (A) and ventilation valve (B) are alternately moveable into the open position by the operating devices.

According to another aspect of the present invention, a plug coupling is proposed for fluid lines for pressure-sealed connection to a counter-connection, especially on a tank, with an axially displaceable piston in the coupling housing and an operating device for displacing the piston as well as at least one clamping element for connection to the counter-connection, wherein the counter connection has insert taper at its coupling end for acceptance of the outlet valve taper provided with an corresponding chamfer; the counter-connection connects in an axial direction with a centring collar and a groove for acceptance of a sealing ring, the groove surface forming at the same time an impact surface for the outlet valve taper on connection.

According to a further aspect of the present invention, the above-mentioned objects are accomplished by a plug coupling for fluid lines for pressure-sealed connection to a counter-connection, with cylindrically arranged clamping jaws radially adjustable at their front ends from a release into a blocking position, and interlocking in the blocking direction into the counter element and with an axially adjustable sleeve under spring pre-tension, the interior surface of the sleeve lying in blocking position against the exterior surface of the clamping jaws, said sleeve being found at a distance from the clamping jaws in release position, wherein locking hooks are provided on the clamping jaws, the locking hooks in the release position being pressed by a spring and locking the sleeve in a form-fitting manner at a distance away; an axially moveable contact element for contacting with the face side of the counter-connection is provided which is moveable against pressing of the spring on occurrence of axial coupling movement, said contact element releasing the sleeve in the blocking position for axial displacement.

The arrangement of the inlet valve, the ventilation valve and the outlet valve in one housing allows their operation in one hand movement and thus permits ease of operation; reciprocal operation or locking of the valves are so closely controlled in operation that even carelessness, ignorance or faulty handling cannot result in the release of fluids under pressure. This coupling is thus suitable for use by untrained people without risk, e.g., for use at filling stations by any motorist. The foolproof design of the coupling allows the greatest possible safety even with deliberate faulty handling; the same is true of the special counter-connection in FIG. 7.

In the coupling according to claim 10, the clamping jaws are always held apart in the release position in the non-coupled state, so that the sleeve is held in the withdrawn position by the locking hooks, and pushing back of the sleeve prior to coupling is superfluous. The plug coupling only has to be grasped and remains ready for coupling onto the counter element due to the constant release position.

In the coupling movement onto the counter element, the contact element is axially displaced in the course of a movement by the counter element itself, the sleeve thus being released and then snapping over the clamping jaws; no further hand operation or movement other than the coupling movement itself are necessary.

In addition to this one-hand operation, where the handling point on the plug coupling can be almost anywhere, a safe and very fast coupling is guaranteed all the more by the snapping over of the sleeve, so that gas or liquid under pressure cannot escape even by delayed releasing of the plug coupling, since the sleeve moving over the clamping jaws automatically and immediately establishes the contact and locks.

Uncoupling is also advantageously designed since drawing back the sleeve in one hand movement occurs almost at the same time as releasing the clamping jaws; the plug coupling can thus then be removed. No further finger movements or use of the second hand are necessary. In addition, fast uncoupling occurs at the same time as automatic opening of the clamping jaws, so that the plug coupling can be coupled with another counter element for example in the shortest possible time without further finger or hand operation.

The simplicity of the plug coupling's construction remains advantageous since the locking hooks and as required the contact elements can be constructed with the clamping jaws as one part; complicated additional parts are thus unnecessary.

BRIEF DESCRIPTION OF THE DRAWINGS

Figure 1:
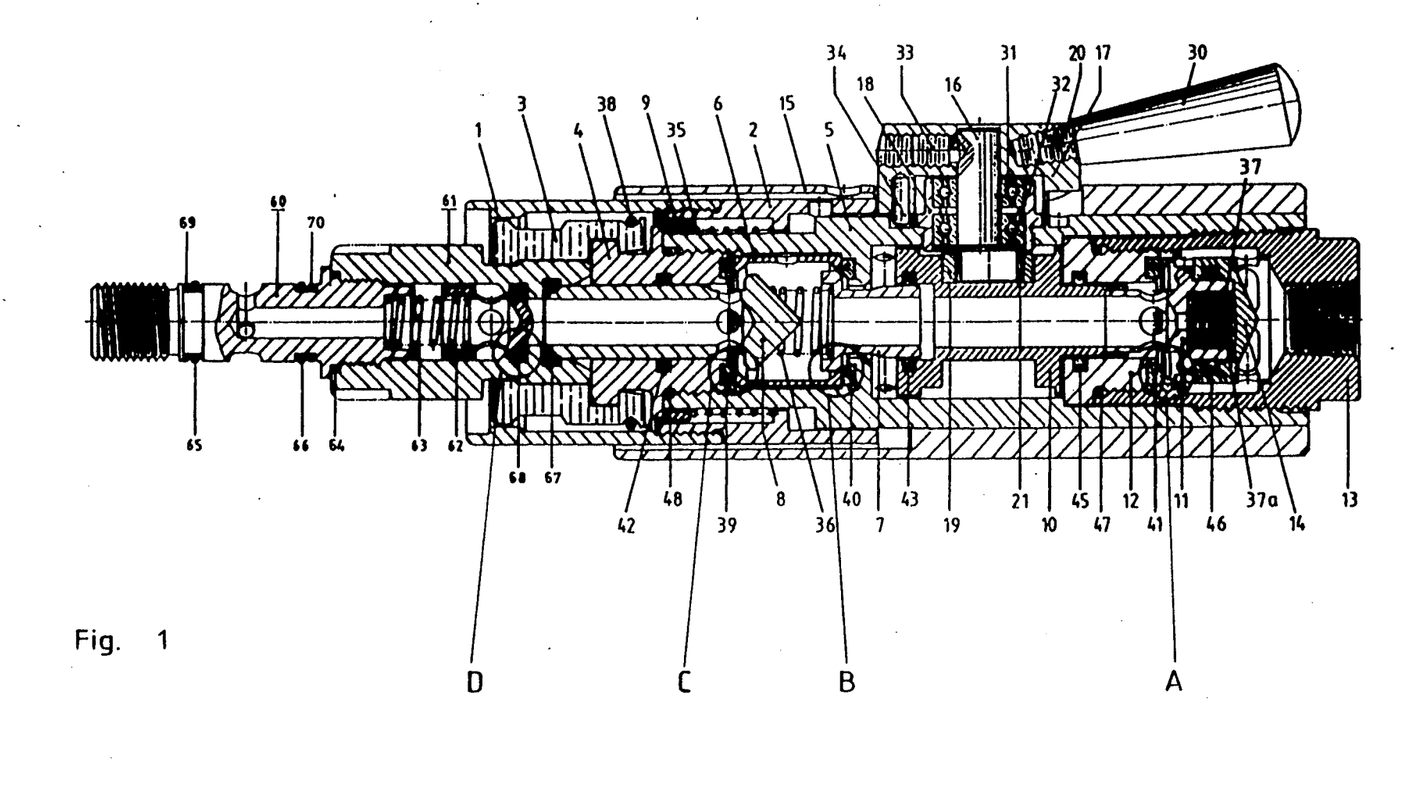
FIG. 1 an axial section through a first embodiment of the coupling with coupled counter-connection, FIG. 2 an enlarged axial section through the first embodiment, FIG. 3 an axial section through a second embodiment, FIG. 4 a schematic diagram of the valve positions of the coupling on operating without counter-connection, FIG. 5 a schematic diagram of the valve positions of the coupling on coupling with the counter-connection, FIG. 6 a schematic diagram of the valve positions of the coupling on uncoupling from the counter-connection, FIG. 7 an enlarged diagram of the counter-connection, FIG. 8 a third embodiment of the plug coupling, FIG. 9 the embodiment of FIG. 8 in coupled state, FIG. 10 a fourth embodiment of the plug coupling.

FIG. 1 shows a first embodiment of the coupling with a coupled counter-connection 61, nipple-shaped in this construction, having a connection thread, shown here on its left-hand end, to a tank to be filled (not shown). On the right-hand side, a connection thread is also provided in an inlet valve housing 13 for connection to a pressure source, e.g. a compressor.

The mainly cylindrical coupling consists of a bushing 1, connected to a sleeve 2, here screw-fastened; on the front end of the bushing a ring-shaped clamping enlargement enclosing a clamping-pincer clamping element 3. Due to axial displacement of the bushing 1 and sleeve 2, under the influence of a clamping spring 35, the clamping element 3 can spring outwards in terms of an enlargement of diameter and thus release the counter-connection 61. The clamping spring 35 is supported via a supporting ring 9 on a guide bushing 4, which, with the insertion of a sealing ring 48, is connected to an elongated housing 5 of the coupling. The connection, here screw-fastened, is only for assembly and manufacturing purposes: the guide bushing 4 and housing 5 could be constructed as one part. On its end towards the counter connection 61, the guide bushing 4 has an edge all round in which the clamping element 3 engages; the clamping jaws of the clamping element can be radially forced apart under the influence of a spring washer 38 on axial displacement of the bushing, so that a type of funnel is formed, from or into which the counter-connection 61 can be pushed.

The axial displacement of the bushing 1 in the illustrated position of the operating device 30, here in the form of an operating handle 20, is blocked, the sleeve 2 lying on the peripheral surface of an operating head 17. The clamping element 3 is blocked in the engaged state in the counter-connection 61. Only by turning the operating handle 20 approximately 180° relative to the illustrated position can a recess 17' arranged beneath the screw-in location in the operating head 17 move to the sleeve 2, so that the sleeve can be pushed—here to the right—under the influence of the spring 35; the forcing apart of the clamping element thus achieved releases the counter-contact 61. To prevent operating personnel from catching their fingers when axial movement occurs, a protective housing 15 is provided for the a entire coupling. The recess 17' is preferred as circular arc or constructed as eccentric surface displaced relative to the axis of the shaft 16. Other operating devices 30 may also be: pivoted handles, pull-on bushings, or turn-lock fasteners.

The operating head 17 is fastened turn-proof by a pin 33 on a shaft 16 which is rotatably mounted by means of bearings 31, 32 and bearing housing 18 in the housing 5. To limit the turning angle of the operating handle 20, a cylindrical pin 34 is provided as stop.

The shaft 16 has an eccentric pivot on which a control reel 19 is mounted by means of a bearing bushing 21. The control reel engages in a control piston 10 axially displaceable in housing 5; said control piston is activated on one side in an inlet valve housing 13 connected to the inlet valve 12 and sealed by means of a seal 45. The inlet valve housing 13 and inlet valve seating 12 are screw-fastened together for manufacturing reasons with sealing by means of a sealing ring 47, the sealing ring 41 with an interior taper forming together with an inlet valve taper 11 the sealing position of the inlet valve A.

The inlet valve taper 11 is connected axially displaceable to the control piston 10 and here axially displaceable to the right into the open position illustrated of the inlet valve A against the spring force of springs 37 and 37a, with sealing by a sealing element 46. The springs 37 and 37a are supported on the pressure bushing 14 provided with openings, this fitting the inlet valve housing 13. In the illustrated open position of the inlet valve A, the fluid under pressure passes through the inlet valve housing 13 via the above-mentioned openings, as shown by the dashed arrow, into the ring space around the pressure bushing 14, through the opening gap between inlet valve taper 11 and sealing ring 41 into the interior of the control piston 10.

The pressure bushing 14 has in this advantageous embodiment on the side towards the pressure source, here on the right, a larger effective pressure surface than the effective surface towards the outlet side, which is determined mainly by the diameter of the inlet valve taper 11. A differential pressure thus results which works towards the closure of the inlet valve A, and, for the same pressure on both sides, keeps the inlet valve A closed. The inlet valve A can only be opened from the self-locking closed position by the mechanical contact with the operating device 30 via the control piston 10. It is thus certain that the opening of the inlet valve A and the ingress of the fluid can only occur in the illustrated position of the operating device 30: the sleeve 2 has already been pushed to the left by the operating head 17, the clamping element 3 is thus safely locked.

On the other (here, left) side of the control piston 10, another valve taper 7, being a smooth-surfaced continuation of the said piston's interior, is inserted in place, with sealing by a sealing element 43, and is displaceable with limited axial movement. The valve taper 7 forms together with the sealing ring 40 the sealing position of a ventilation valve B, which when open can blow out pressurized gas or fluid from the pressurized space, in which a clamping spring is arranged, via the exterior surface of the valve taper 7, openings in the housing 5 and the ring gap between protective housing 15 and sleeve 2 or bushing 1. A spacing bushing 6 is placed over the above-mentioned clamping spring 36, this fixing in place the sealing ring 40 of the ventilation valve B and a sealing ring 39 of the outlet valve C.

Figure 2:
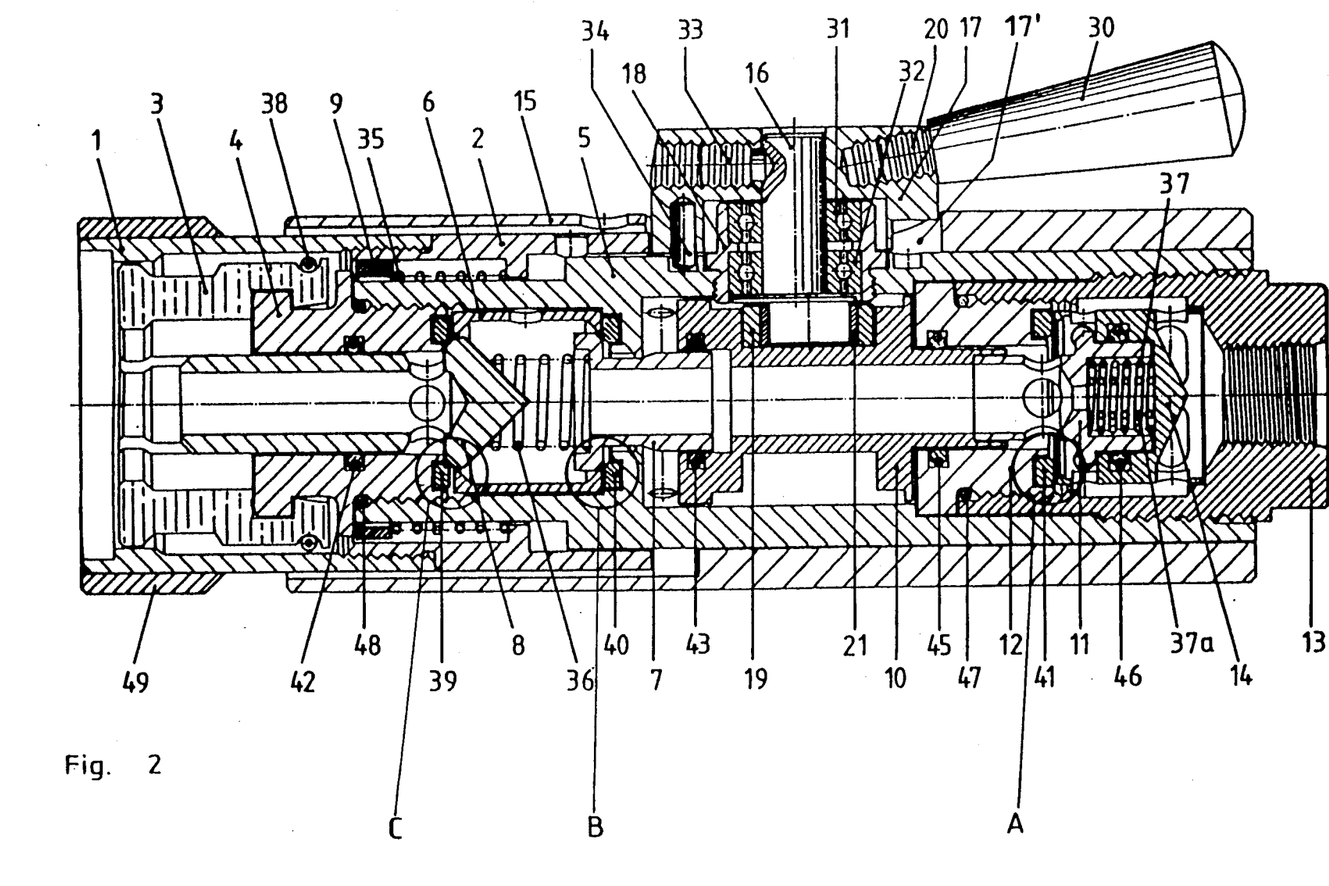

The sealing ring 39 functions in conjunction with an outlet valve taper 8 and thus forms the sealing position of the outlet valve C. The outlet valve taper 8 is axially moveable in the guide bushing 4 mentioned at the beginning with sealing by means of a sealing element 42, movement taking place to the right into the open position (FIG. 1) due to the coupling movement of the counter-connection 61. If the counter-connection 61 is not connected or on disconnection, the outlet valve taper 8 moves to the left under the influence of the spring force of the spring 36 into the closing position (FIG. 2). To support the closing movement, the outlet valve taper 8 can be constructed with a larger piston surface towards the pressure side; a similar way is described above for the inlet valve taper 11, the valve taper 7 having varying effective surfaces towards the inlet or outlet sides, so that the valve taper 7 is pressed into its closed positions additionally to the spring force when pressurized fluid flows through.

The ventilation valve B is closed in the shown position and can be brought into the open position exclusively via displacement of the control piston 10 to the left by turning the operating device 30 180°. The right face side of the valve taper 7 lies here on the correspondingly constructed left contact surface of the control piston 10, and is displaced by said piston to the left against the spring force of the spring 36. This movement reinforces the spring pressure on the outlet valve taper 8 additionally to the fluid pressure, so that here an uninterrupted closing force is applied which can only be lifted by the axial displacement when the counter-connection 61 is connected. On opening the ventilation valve B, the inlet valve A is already safely closed, since the mechanical lifting of the inlet valve taper 11 by the control piston 10 is already lifted following a small turning angle of the operating device 30, and is firmly closed under spring pressure and/or differential pressure on varying piston surfaces, while a turning angle of approx. 90° is required to open the ventilation valve B.

As shown by the arrow (FIG. 2), the pressurized fluid moves from the interior of the control piston 10 through the opening in the valve taper 7 via the open outlet valve taper 8 to the check valve D of the counter-connection 61; this is formed by a valve body 62 which is pressed against a sealing ring 68 under the spring pressure of a spring 63. The counter-connection 61 has a sealing element 67 which is pushed against the conical chamfer (there for ease of insertion) of the outlet valve taper 8 and is in sealing position. When the check valve D is opened by the fluid pressure, the fluid moves to a tank, e.g. of motor vehicle, via a connection spigot 60 provided with sealing elements 64, 65, 66, 69, 70.

FIG. 2 shows the coupling according to FIG. 1 in enlarged diagrammatic form, however without the counter-connection 61, so that the outlet valve C is closed here for safety purposes under the pressure of the spring 36 and of the fluid when it flows.

Figure 3:
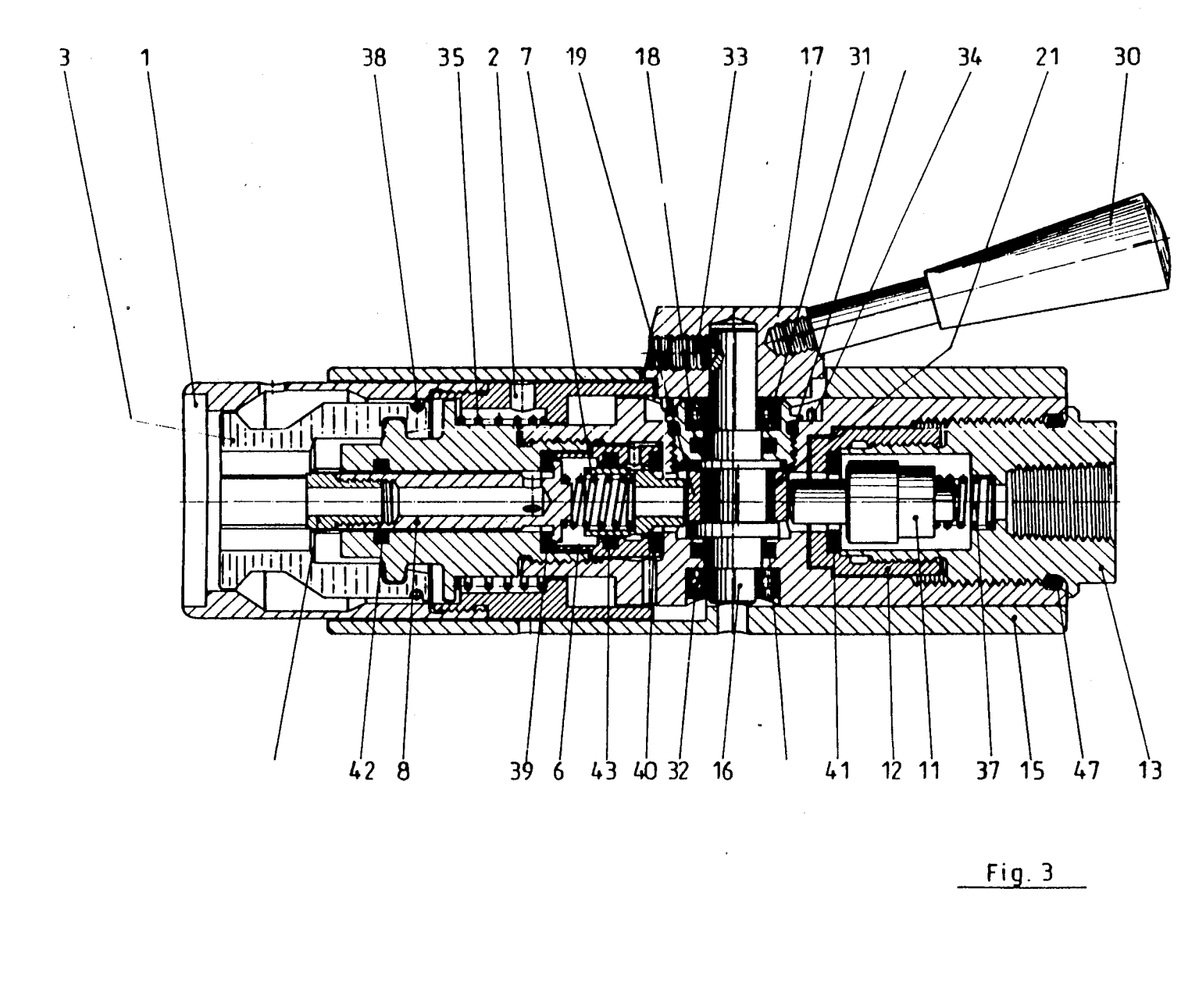
Figure 4A:
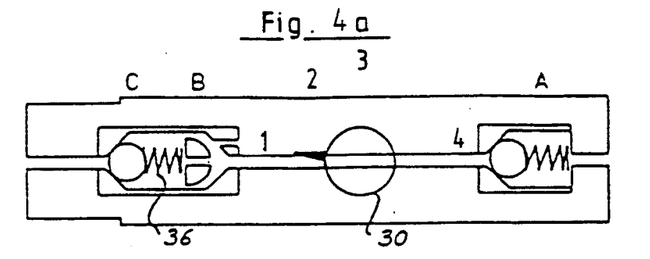
Figure 4B:
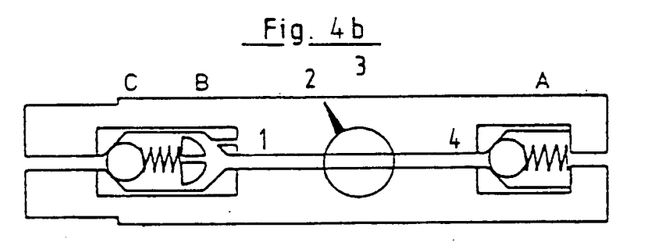
Figure 4C:
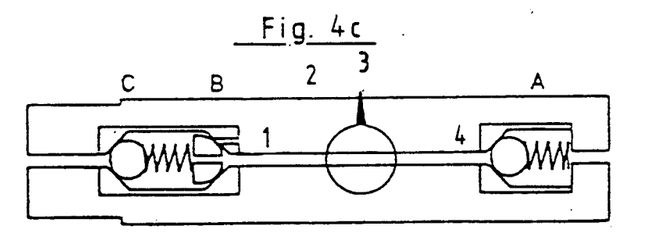
Figure 4D:
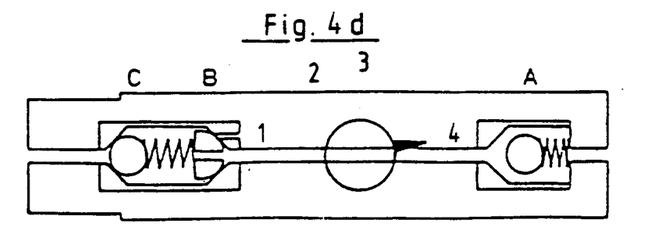
Figure 5A:
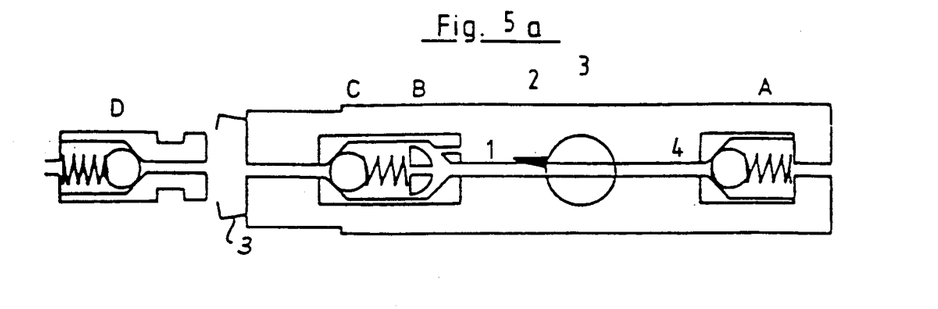
Figure 5B:
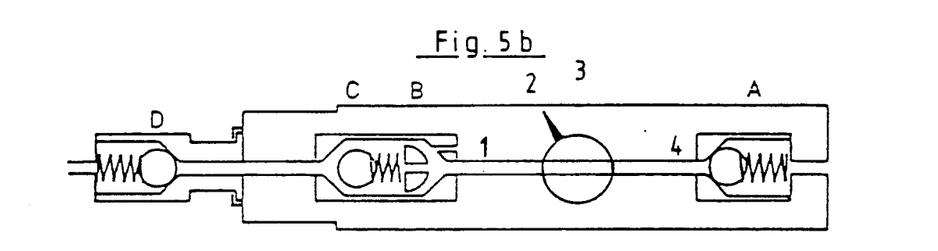
Figure 5C:
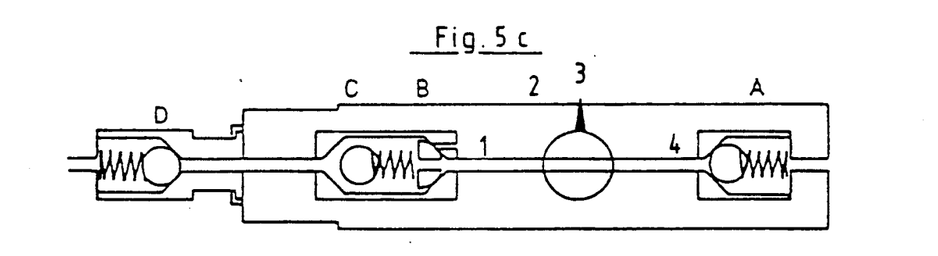
Figure 5D:
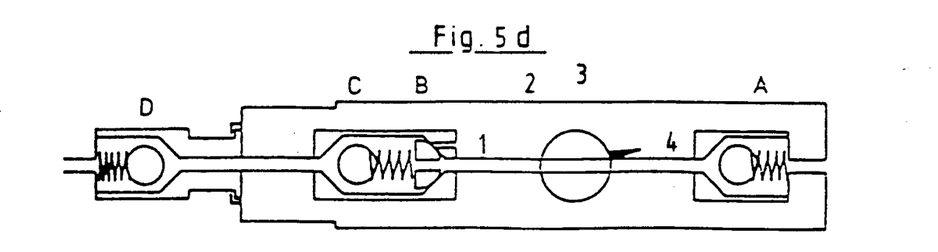
Figure 6A:
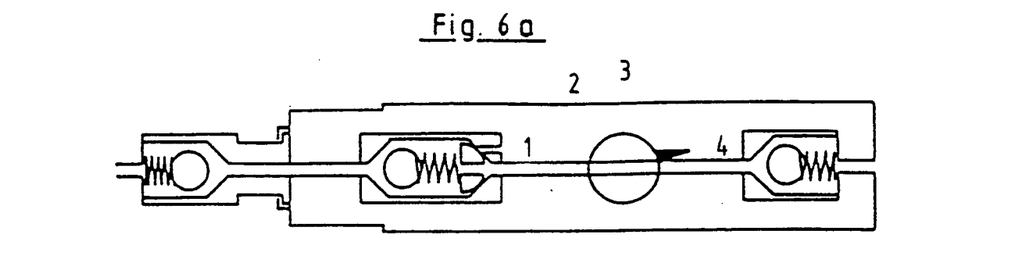
Figure 6B:
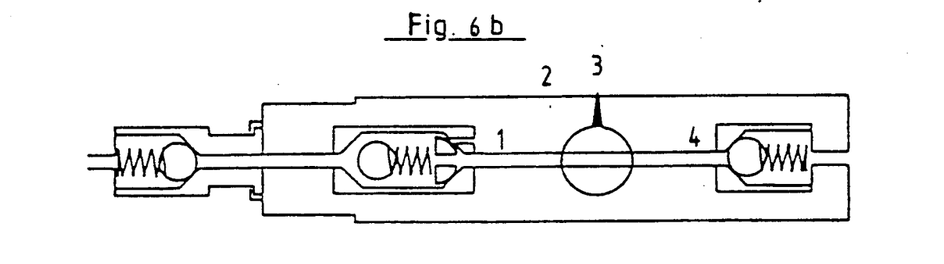
Figure 6C:
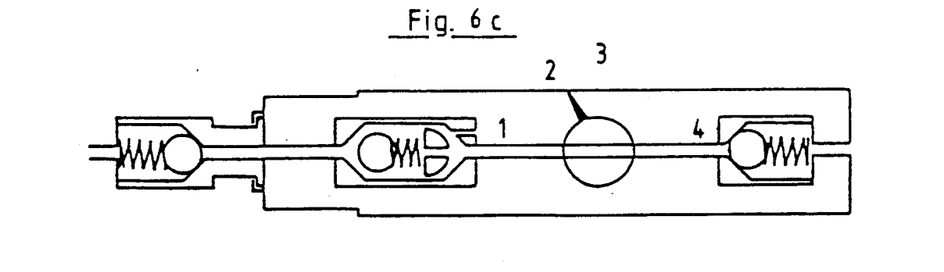
Figure 6D:
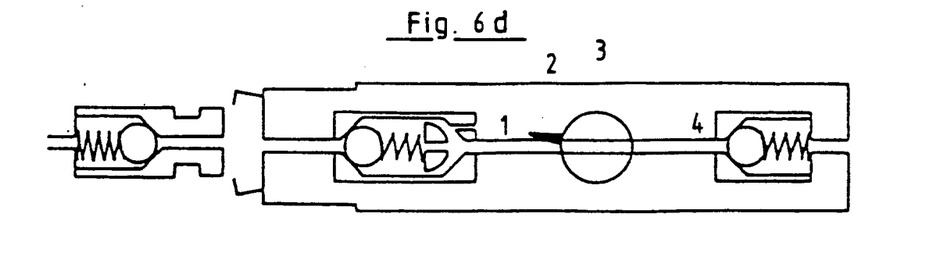

FIG. 3 shows another embodiment in which the reference numbers of the main component parts of the safety coupling are retained. The main difference is the continuously constructed eccentric shaft 16, allowing the advantageous removal of the control shaft 10; the inlet valve A is shown here without the section through the inlet valve taper 11, and the ventilation valve B is operated directly from the eccentric shaft 16 or its control reel 19. This embodiment thus offers the advantage of needing fewer components, whereas the embodiment according to FIGS. 1 and 2 offers a continual flow and higher flow rate through the interior of the control pistons 10; solely an eccentric shaft 16 mounted on one side is provided. Another difference consists of the outlet valve and inlet valve tapers 8 and 11 being constructed in FIG. 3 as mushroom-shaped instead of conical-shaped sealing positions. In addition, the limited volume of the pressure fluid does not escape in the open position of the ventilation valve B axially through a ring gap, but radially through openings in the housing 5 and protective housing 15, directly beneath the eccentric shaft 16.

FIG. 4 schematically shows the working together of the operating devices 30 (here in plan view with four operating positions (a)–(d) over an operating range of approx. 180°) and of the valves A,B,C on operating the coupling without connection of the counter-connection 61. The situation of faulty handling is represented, as if for example an untrained motorist were to use the coupling at a filling station; on the right-hand side near inlet valve A, pressure from the pressure source, e.g., a petrol pump, is applied, and this inexpert operation may not result in fluid under pressure flowing out.

In the upper part-figure (a), the operation (1) is shown. The ventilation valve B is open, whereas the inlet valve A is closed by spring and fluid pressure and outlet valve C by spring force. In operating position (2) (see part-figure (b)) the control piston 10 is moved via the eccentrically mounted control reel 19 to the right (cf. FIG. 1) so that the valve taper 7 is no longer in contact with the control piston 10 (FIGS. 1 and 2) or control reel 19 (FIG. 3), as shown in part-figure (c) and begins to close under the spring pressure of the spring 36. In operation position (3), the ventilation valve B is completely closed, before the inlet valve (A) in operating position (4) is lifted by the control piston or control reel 19 (FIG. 3), and fluid can flow into the coupling. The outlet valve C is closed, however, the closing force being additionally increased; in operation, fluid under pressure cannot thus flow out without connection of the counter-connection 61.

FIGS. 5 (a)–(d) show the corresponding operating positions on connection of the counter element 61. In position (1) as shown in part figure (a), the clamping elements 3 open into a funnel shape due to the sleeve 2 under spring pressure being displaced to the right. On coupling, the outlet valve taper 8 is axially displaced; the outlet valve C is thus opened. This is only possible if pressure is not applied to the outlet valve taper 8. This open position can only be achieved and maintained by correct connection. On moving from operating position (2) to (3) (part figure (b) to (c)), the ventilation valve B is closed before in position (4) the inlet valve A is brought into the open position by lifting. The check valve D is opened by the fluid flowing in and the tank or similar object is filled. As the diagram shows, the opening angle from (3) to (4) is the largest with approx. 90° compared to the other operating angle. It is thus certain that the ventilation valve B is closed in time before the inlet valve A opens.

FIGS. 6 (a)–(d) shows the disconnection in the opposite direction, going from operating position (4) to (1); operating position (4) corresponds to part-figure (d) of FIG. 5 with uninterrupted pressure on filling a tank.

On moving to operating position (3), the inlet valve (A) is closed, the check valve (D) thus closing also. Turning further into position (2) results in ventilation of the coupling by opening of the ventilation valve B, a very small amount of fluid flowing out, so that the clamping pincers are free of axial pressure. The additional spring pressure on the spring 36 on opening the ventilation valve B also closes the outlet valve C. A displacement of the sleeve 2 is in turn only possible in the operating position (1), so that the clamping element 3 opens automatically and releases the counter-connection 61. Opening the ventilation valve B already in the operating position (2) ensures that ventilation occurs before the clamping elements are open, i.e., pressure is no longer applied to the counter-connection 61.

It is thus evident that before the opening of the ventilation valve B for example the inlet valve A is already safely closed, so that even faulty handling without connected counter element cannot lead to flowing out under pressure. The reciprocal closing of the valves with alternating opening and ventilation ensures that the counter-connection and its clamping jaws 3 can never be opened under pressure; the single lever operation also ensures simplicity of use.

Figure 7:
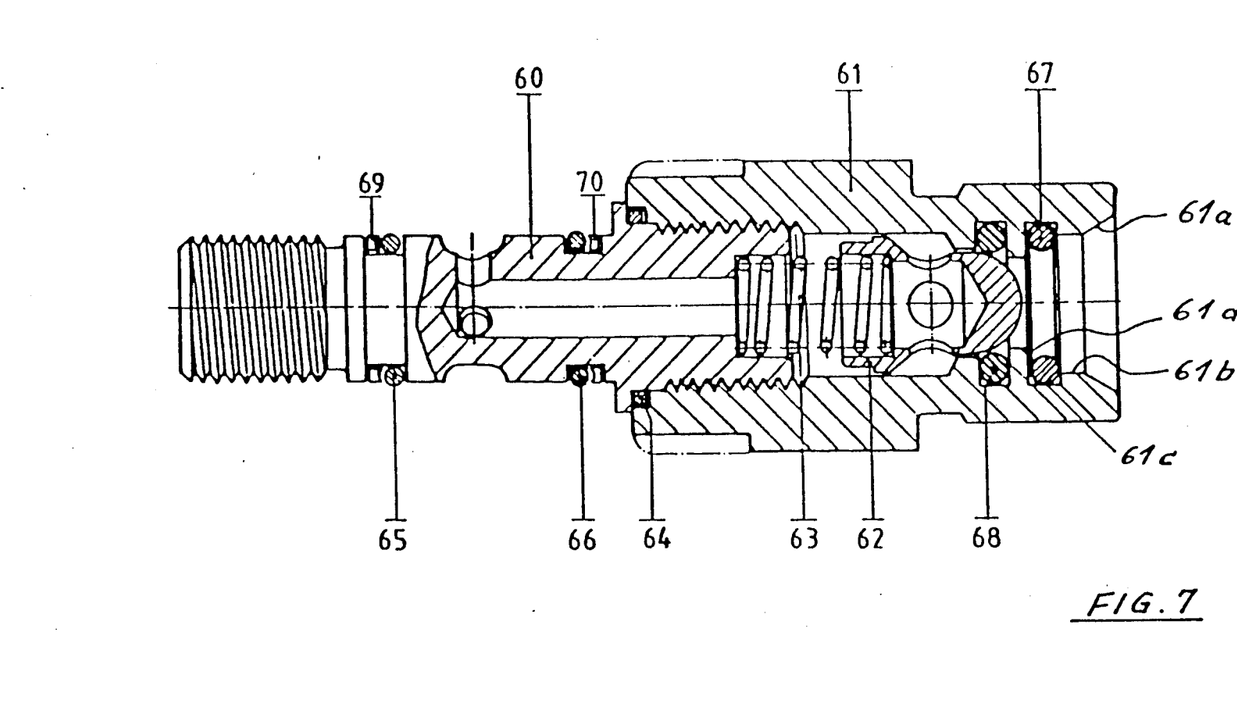

FIG. 7 shows the enlarged representation of the nipple-shaped counter-connection 61. As evident from the coupled position in FIG. 1, the counter-connection 61 is pushed over the outlet valve taper 8. Operation in the opposite direction is entirely possible.

The counter-connection 61 has an insertion cone 61a which works together with a chamfer 8a of the outlet valve taper 8. A quick and safe insertion is ensured, both parts 8 and 61 being reciprocally centred by the following collar 61b before the chamfer 8a moves into sealing position with the sealing ring 67. It is only after achievement of this sealing that the face side of the outlet valve taper 8 contacts with the contact surface 61d, so that only at this point in time, that is, after achievement of complete sealing, can the outlet valve taper 8 be axially displaced and thus the outlet valve C be brought into the open position (cf. FIG.1). It is thus certain that on lifting of the outlet valve C, a sealing position is already present, and thus, even if a valve is defective, for example outlet valve A, there is adequate safety. In addition to the ease of use and high safety, the smooth-surfaced transition from outlet valve C to counter-connection 61 is advantageous.

It remains to be observed that, for a variety of uses, two valves, e.g. inlet and ventilation valves A,B, can be functionally brought together in one ball valve.

Figure 8:
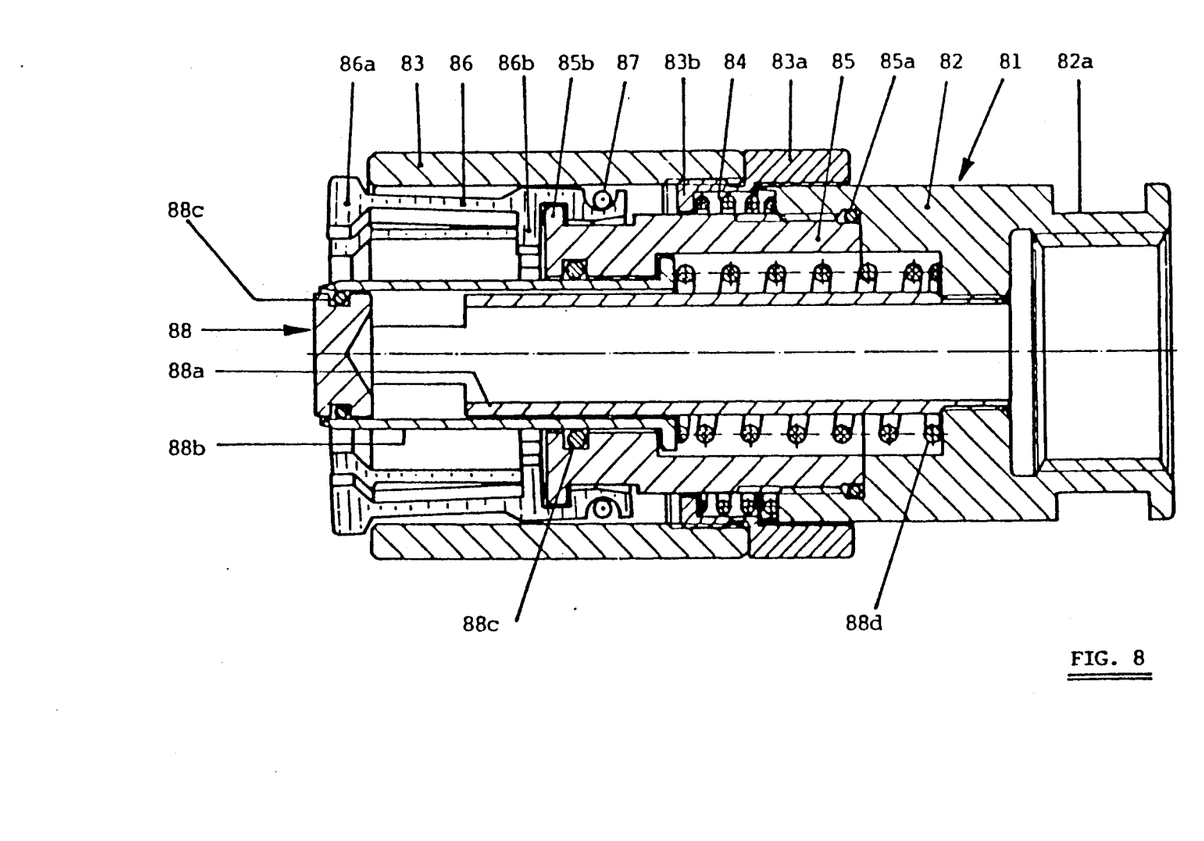
Figure 9:
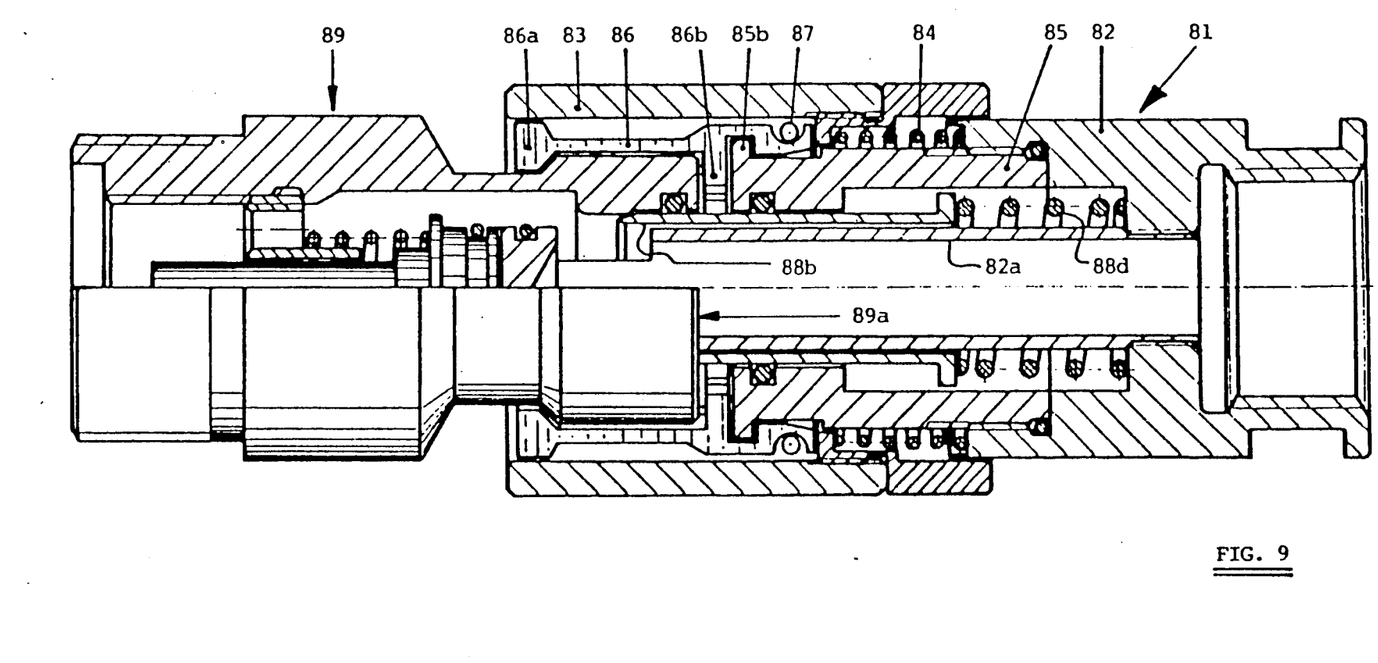
Figure 10:
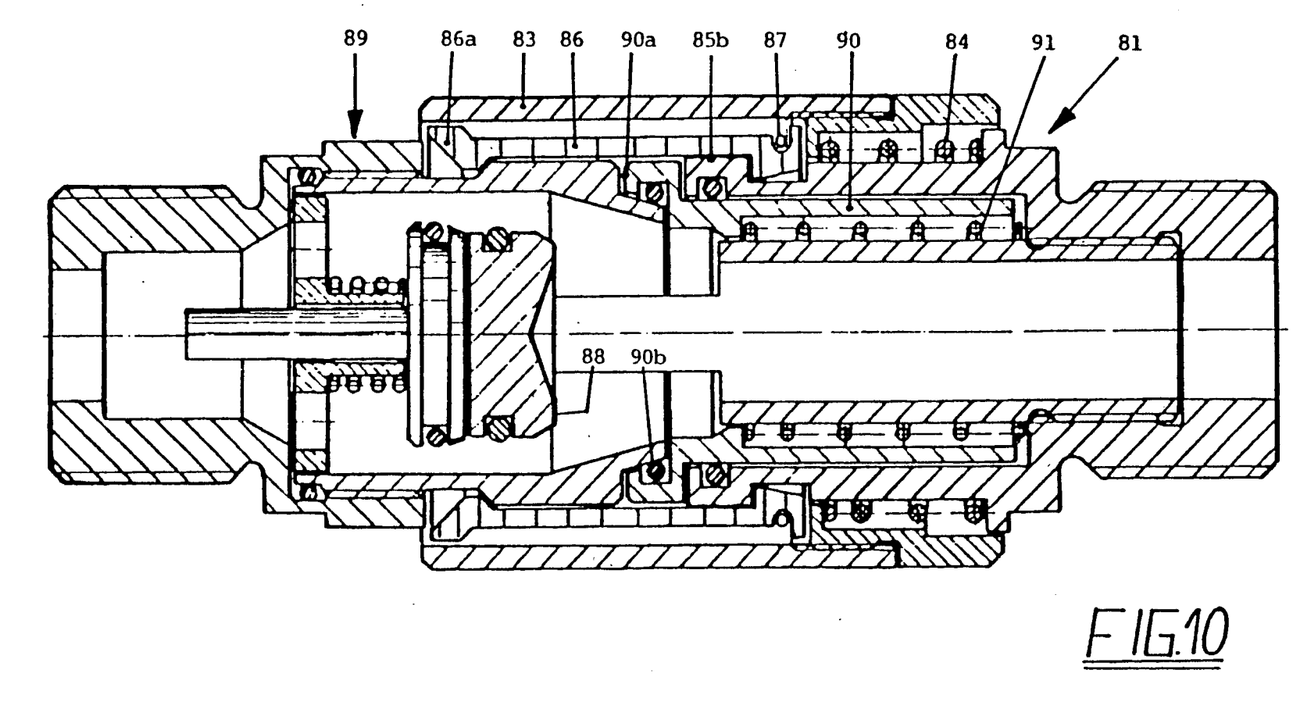

FIGS. 8 to 10 show couplings on which a handle has been dispensed with. The clamping jaws correspond mainly to the clamping jaws 3 of FIGS. 1–3 and are locked/released by a sleeve 83, which corresponds very appreciably to the bushing 1 of FIGS. 1–3.

FIG. 8 shows such a plug coupling 81 consisting of a cylindrical coupling body 82 having a connection part 82a on its (here) right side. This connection part 82a can be connected to a pressure medium line, e.g. to a hydraulic hose. This connection part passes into a central passage opening not described in more detail, which passes through the entire plug coupling 81.

The coupling body 82 partly encloses a sleeve 83 screw-fastened to a sleeve end element 83a. This has a contact ring 83b which supports a spring 84. This encloses a bearing bushing 85 screw-fastened to the coupling body 82. As for the sleeve 83 with the sleeve end element 83a, the bearing bushing 85 with the coupling body 82 can also be constructed as one part; a sealing ring 85a provides a reliable seal between bearing bushing 85 and coupling body 82.

At the front end of the bearing bushing 85, a bearing ring 85b is constructed as all-around enlargement, the hook-shaped clamping jaws 86 being inserted into said bearing ring. The clamping jaws 86 can be constructed as several individual elements or as one single clamping pincer with slotted clamping jaws.

At the front end of the clamping jaws 86, locking hooks 86a are arranged which, in the release position of the clamping jaws shown here, prevent the sleeve 83 from moving to the left. In this release position, a counter element 89 (cf. FIG. 9) can be coupled or disconnected. The spring 84 of the sleeve 83 is here under increased pressure and locks the sleeve 83 in this position which is drawn back or at a distance from the clamping jaws 86.

The locking hooks 86a, here pointing outwards, which hold the sleeve in its drawn-back position, come into contact with a spring 87 at the rear end of the clamping jaws 86 and are thus forced outwards. The spring 87 constructed here as a spring washer thus forces the clamping jaws 86 apart and outwards, the bearing ring 85b serving as pivot point on all sides for the clamping jaws 86. This forcing apart of the clamping jaws 86 prevents the sleeve 83 from moving forward into the blocking position over the clamping jaws 86. The locking hooks 86a are constructed here as one part with the clamping jaws 86, although they can also be constructed separately as locking hooks 86a mounted on the clamping jaws 86.

FIG. 8 also shows a shut-off valve 88 consisting of an interior pipe 88a fixed in place and a displaceable exterior pipe 88b. The exterior pipe displaceable axially under spring pressure of the pressure spring 88b is sealed with two sealing rings 88c against both the interior pipe 88a and also the bearing bushing 85. A reliable sealing of the plug coupling is also ensured in the shown release or open position in the disconnected state. This shut-off valve 88 is not absolutely essential to the functioning of the plug coupling and can be left out.

FIG. 9 shows the plug coupling in the coupled state with the counter-connection 89 (blocking position). On coupling the counter-connection 89 to the release position of the plug coupling 81 shown in FIG. 8, the face surface 89a of the counter-connection comes into contact with angle-lever-type contact surfaces 86b of the clamping jaws 86. Due to the manual pressure during the coupling movement the angle-lever-type contact surfaces are here displaced to the right or swung about the bearing ring 85b. The clamping jaws 86 are swung inwards against the spring force of the spring 87, so that its front ends engage in the correspondingly-shaped recess on the counter-connection. This radial adjustment inwards causes the locking hooks 86a to be radially adjusted inwards and to be now ineffective due to the smaller diameter, so that the spring 84 can displace the sleeve 83 over the clamping jaws 86. The plug coupling 81 is thus safely connected to the counter-connection 89. At the same time as the face surface 89a contacts with the contact surface 86b, the exterior pipe 88b is displaced against the force of the spring 88d, so that the medium can flow in the opposite direction from the plug coupling 81 to the counter element 89.

FIG. 10 shows a fourth embodiment of the plug coupling according to the invention. Relative to FIGS. 8 and 9 it has as axially moveable contact element a bushing 90 independent of the clamping jaws instead of the contact surface 86b on the clamping jaws 86, said bushing constantly under the contact pressure of the spring 91. The plug coupling in FIG. 10 is, as in FIG. 9, in the blocking position, shown therefore in the coupled state. The clamping jaws 86 engage in an all-around recess on the counter-connection 89. The face side 89a of the counter-connection comes into contact here with a contact ring 90a at the front end of the bushing 90. The counter element 89 is sealed relative to the bushing 90 and therefore relative to the plug coupling 81 via a sealing ring 90b.

For disconnection the sleeve 83 is drawn back, here to the right against the spring 84, so that the clamping jaws 86 are released outwards and can move apart outwards under the influence of the spring 87. This spring 87 can be constructed relatively weak or can be left out, in contrast to FIGS. 8 and 9, where the spring 87 brings about the moving apart of the clamping jaws 86 and of the locking hooks 86a and thus the locking of the sleeve 83; this is due in this embodiment to the locking of the sleeve 83 by the moving apart of the locking hooks 86a, by the bushing 90 in release position pushing forward. The spring 91 pushes the bushing or its contact ring 90a as far as the front end of the clamping jaws 86, so that the locking hooks 86a are forced outwards and thus hold back the sleeve 83 in the pre-tensioned position.

If the sleeve 83 is deliberately (or accidentally) drawn back, thus releasing the clamping jaws 86, then the shut-off valve 88 closes immediately; it is constructed here as a bevel seat valve. It is also mentioned in addition that the plug coupling according to the invention may be used not only to pass pressurized medium to a device, but also to apply a vacuum to such a device. Although the plug coupling with clamping jaws gripping the exterior of the counter-connection has been described here, the invention can be realised in the corresponding manner with clamping jaws acting from the interior on the counter element. In this case in the release position, the clamping jaws are not forced apart outwards, but in a radial direction inwards. In the blocking position the clamping jaws are then forced apart outwards to engage in the counter element.

Attention is drawn to the fact that pushing back of the sleeve 83 can take place additionally or instead of hand operation by pressure contact, such as a pneumatic cylinder or a hand lever, as shown in FIGS. 1-3.

We claim:

1. A coupling for fluid lines for pressure-sealed connection to a counter-connection, especially of a high-pressure tank for gas, with an axially displaceable control piston in a coupling housing, an operating device for displacing the control piston, at least one clamping element for connection to the counter-connection, said clamping element having an exterior surface, a sleeve which is axially displaceable relative to said housing and is coupled to the operating device so that the operating device controls axial displacement of said sleeve, said sleeve having an interior surface which engages, in a blocking position of said clamping element, the exterior surface of said clamping element and is situated, in a release position of said clamping element, at a distance from said clamping element, wherein:

said counter-connection has a longitudinal axis, an end surface extending transverse to said longitudinal axis and an interior wall extending along the longitudinal axis and defining a gas passage, said interior wall is configured to include, along the longitudinal axis from the end surface, a first inwardly tapered surface, a cylindrical centering collar, an annular groove and a substantially radially extending bearing surface, and said counter-connection further includes a sealing ring disposed in said groove, said coupling further comprises an outlet valve member disposed in said housing for axial movement in said housing, said outlet valve member has a longitudinal axis, a coupling end extending transverse to said longitudinal axis and an interior wall extending along the longitudinal axis and defining a gas passage, and an exterior wall extending along the longitudinal axis and having a surface portion which tapers outwardly from said coupling end, and said counter-connection is connectible to said outlet valve member by relative movement to bring said counter-connection and said outlet valve member into a relative position in which said cylindrical centering collar engages said exterior wall of said outlet valve member, said substantially radially extending bearing surface of said counter-connection bears against said coupling end of said outlet valve member and said sealing ring engages said outwardly tapering surface portion of said exterior wall of said outlet valve member and forms a seal between said valve member, whereby movement of said counter-connection along its said longitudinal axis toward said outlet valve member is transmitted to said outlet valve member via said substantially radially extending bearing surface of said counter-connection and said coupling end of said outlet valve member.

2. A coupling for fluid lines for a pressure-sealed connection to a counter-connection, especially of a high-pressure tank for gas, comprising:

a coupling housing having a central longitudinal axis;

a piston displacably arranged in said coupling housing;

clamping means provided at a front end of said housing for securely connecting said coupling to said counter-connection, said clamping means being controllable by an axial displacement of a sleeve provided on said housing;

an inlet valve means, a ventilation valve means, and an outlet valve means arranged in said coupling housing; and an operating means for axially displacing said sleeve directly and said ventilation valve means and said inlet valve means by means of said control piston in a predetermined sequence;

said operating means being movable between a first position and a second position and being coupled to said sleeve and said piston so that; in said first position of said operating means, said sleeve is in a clamping position to cause said clamping means to securely connect said coupling to said counter-connection and said piston is in a position to open said inlet valve means and close said ventilation valve means; and in said second position of said operating means, said sleeve is in an unclamping position for allowing said clamping means to move in order to permit disconnection of said counter-connection from said coupling, and said piston is in a position to close said inlet valve means and open said ventilation valve means.

3. The coupling of claim 2, wherein said operating device comprises an eccentric shaft, being mounted on one side of a central passage in said coupling housing and engaging positively in said control piston controlling said open position of said inlet valve means or of said ventilation valve means.

4. The coupling of claim 3, wherein the eccentric shaft on one side of a central passage in said coupling housing is mounted on one side and engages positively in a control piston controlling said open position of said inlet valve or of said ventilation valve.

5. The coupling of claim 3, wherein said eccentric shaft in said housing is mounted on both sides of a central passage and said inlet valve and said ventilation valve can be reversed directly by said eccentric shaft.

6. The coupling of claim 2, wherein said ventilation valve means and said outlet valve means are held in closed position by mutual spring means.

7. The coupling of claim 2, wherein said ventilation valve means in open position discharges into a sealing ring gap between said coupling housing and a protective housing.

8. The coupling of claim 2, wherein said counter-connection has at its coupling-side end an insertion taper for receiving of an outlet valve taper provided with a corresponding chamfer and connects in axial direction to a centering collar and a groove for receiving of a sealing ring, the groove surface being designed as contact surface for the outlet valve taper upon connection as well.

9. The coupling of claim 2, wherein said operating device has an operating position in which said inlet valve means is open and said clamping means closed in one of the preceding operating positions, as well as a second operating position in which said clamping means are open and the inlet valve means is closed in one of the preceding operating positions.

10. The coupling of claim 2, wherein said clamping means can be connected or disconnected exclusively upon preceding ventilation or pressureless operating by said ventilation valve means.

11. The coupling of claim 15, wherein said clamping means are cylindrically arranged clamping jaws radially adjustable with their front ends from a release into a blocking position, and engaging positively in said blocking direction on the counter-connection;
said axially displaceable sleeve being biased, the interior surface thereof engaging in blocking position the exterior surfaces of said clamping jaws and being positioned in release position at a distance from said clamping jaws, wherein the clamping jaws are provided with locking hooks which are biased in release position by a spring and lock said sleeve positively in remote position.

12. The coupling of claim 11, wherein said contact element is formed on said clamping jaws and is designed as angle-lever-type contact surface.

13. The coupling of claim 11, wherein said contact element is formed as a bushing which by the action of said first spring and, is desired of said secured radially adjusts said clamping jaws in release position by means of said contact ring.

14. The coupling of claim 11, wherein said second spring is a spring washer gripping said clamping jaws around a rear end thereof.

15. The coupling of claim 2 wherein:
said coupling housing has a central longitudinal axis;
said counter-connection has a longitudinal axis, an end surface extending transverse to said longitudinal axis and an interior wall extending along the longitudinal axis and defining a gas passage, said interior wall is configured to include, along the longitudinal axis from the end surface, a first inwardly tapered surface, a cylindrical centering collar, an annular groove and a substantially radially extending bearing surface, and said counter-connection further includes a sealing ring disposed in said groove,
said outlet valve means are disposed in said housing for axial movement in said housing, said outlet valve means has a longitudinal axis, a coupling end extending transverse to said longitudinal axis and an interior wall extending along the longitudinal axis and defining a gas passage, and an exterior wall extending along the longitudinal axis and having a surface portion which tapers outwardly from said coupling end, and
said counter-connection is connectible to said outlet valve by relative movement to bring said counter-connection and said outlet valve member into a relative position in which said cylindrical centering collar engages said exterior wall of said outlet valve member, said substantially radially extending bearing surface of said counter-connection bears against said coupling end of said outlet valve member and said sealing ring engages said outwardly tapering surface portion of said exterior wall of said outlet valve member and forms a seal between said valve member, whereby movement of said counter-connection along its said longitudinal axis toward said outlet valve member is transmitted to said outlet valve member via said substantially radially extending bearing surface of said counter-connection and said coupling end of said outlet valve member.

* * * * *